Figure 1:
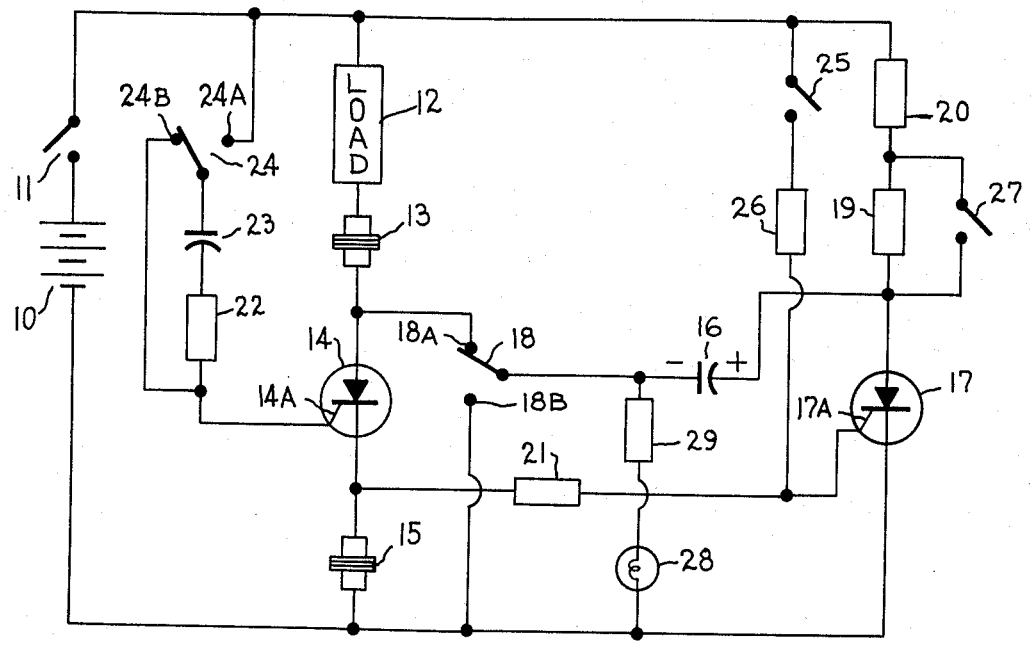

March 1, 1966  E. B. HEFT  3,238,418
ELECTRICAL PROTECTIVE CIRCUIT
Filed June 25, 1962  2 Sheets-Sheet 1

INVENTOR.
ELDON B. HEFT
BY Robert F. Casey
ATTORNEY

INVENTOR.
ELDON B. HEFT
BY Robert H. Casey
ATTORNEY

United States Patent Office 3,238,418
Patented Mar. 1, 1966

3,238,418
ELECTRICAL PROTECTIVE CIRCUIT
Eldon B. Heft, West Hartford, Conn., assignor to General Electric Company, a corporation of New York
Filed June 25, 1962, Ser. No. 204,768
11 Claims. (Cl. 317—33)

My invention relates to electrical protective circuits, and particularly to protective circuits of the type utilizing a control device which is adapted to be change from conducting to non-conducting condition by a predetermined change in current conditions therethrough.

In accordance with the prior art, electrical protective circuits have been provided, utilizing as a main current control device, a device having the characteristic that once placed in a conductive condition with respect to current in a given direction, it remains in such condition until such current is reduced to zero by other means. The device is changed from conducting to non-conducting condition, upon the occurrence of predetermined conditions, by applying to it a voltage which is reversed with relation to the device as compared to the voltage causing the pre-existing current.

A circuit of the type referred to, utilizing a silicon controlled rectifier as the main current control device, is shown in prior application Serial Number 30,484 by Leon J. Goldberg, filed February 2, 1960, now Patent No. 3,098,949, issued July 23, 1963, and in prior application Serial Number 200,771, filed June 7, 1962, by Ralph L. Hurtle and Eldon B. Heft, both applications being assigned to the same assignee as the present invention.

In circuits of the type described, the application of reverse voltage to the main control element has the effect of aiding the primary voltage source in producing current through the remainder of the load circuit. The total impedance of the usual circuit elements of the load circuit, including the load itself, may become very small, due to short-circuit conditions. The result of this may be (1) to create an undesirably high current in the load circuit, and (2) to place an undesirably high drain on the reverse-voltage source. With respect to item 2, this is particularly undesirable when a capacitor is used as the reverse-voltage source, since it causes the capacitor to discharge so rapidly that zero-current condition is not maintained on the main control element long enough to ensure turn-off of that device.

It is an object of the present invention to provide a circuit of the type described including means for assuring that the total load circuit impedance will not become undesirably low even if the impedance of the load itself is decreased drastically, such as to zero, by short-circuit conditions.

It is another object of the invention to provide a circuit of the type described including means for maintaining a desired amount of impedance in the load circuit at the time when reverse voltage is being applied to the main control device, without adding to the impedance of the load circuit at other times.

In accordance with the invention in one form, a control circuit is provided including a main control element having the characteristic that once placed in a conductive condition in a given direction, it remains in such condition until the current therethrough is reduced to zero. A source of turn-off voltage is provided, together with means for applying such voltage to the main control device in a sense opposite to that of the primary voltage. In addition, a current-limiting device is provided connected in series with the normal load in such a way as to limit the magnitude of current in the load circuit when the reverse voltage is applied to the main control device. The current limiting device, moreover, normally has a very low impedance, but changes to a high impedance at such time, such impedance change occurring at a speed which is independent of the rate of change of the current at that time.

The invention will be more fully understood from the following detailed description, and its scope will be pointed out in the appended claims.

Figure 2:
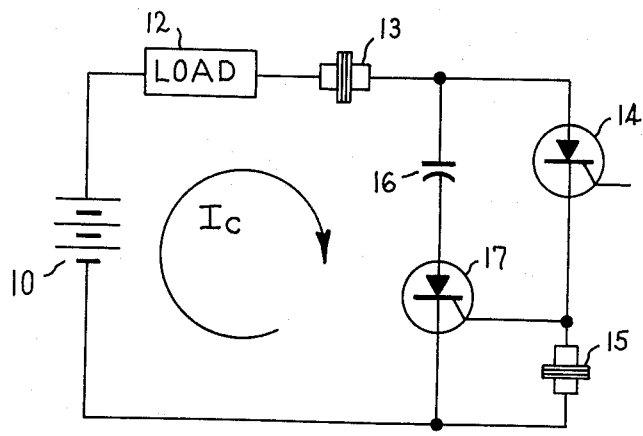
Figure 3:
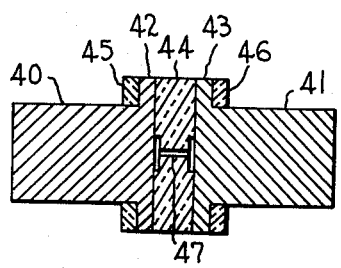
Figure 4:
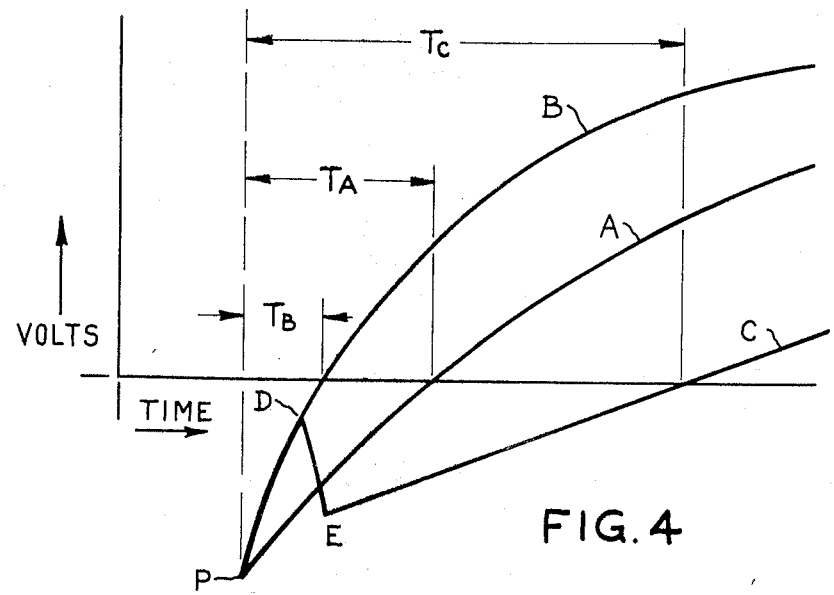
Figure 5:
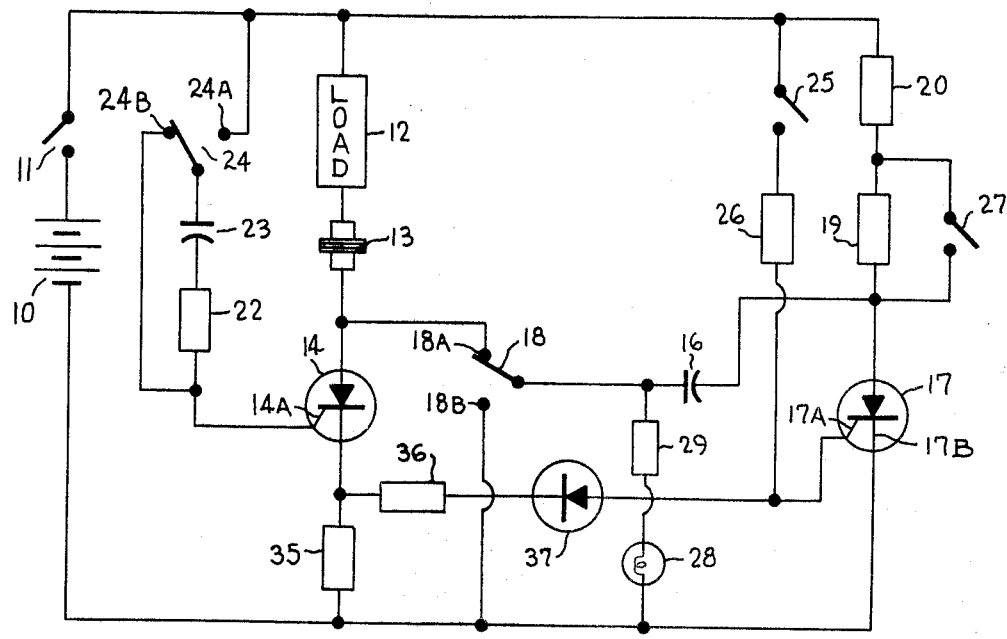

In the drawings:
FIGURE 1 is a schematic diagram of an electrical protective circuit incorporating the invention;
FIGURE 2 is a simplified schematic diagram of the circuit of FIGURE 1;
FIGURE 3 is a sectional view of a current limiting device used in the circuit of FIGURE 1;
FIGURE 4 is a graph showing voltage-versus-time relationship, the voltage being that measured across the main control element, under three different conditions of operation, and
FIGURE 5 is a schematic diagram of another embodiment of the invention.

In FIGURE 1 the invention is shown as incorporated in an electrical protective circuit comprising a direct-current power source 10 having its positive terminal connected through a switch 11 to one terminal of a load 12 having a first current limiting device 13, to be described, connected in series relation therewith.

A main current control device comprising silicon controlled rectifier 14 is also connected in series relation with the load 12 and the limiter 13.

A signal-generating device comprising a second current limiter 15, to be described, is connected in series relation in the load circuit between the controlled rectifier 14 and the negative terminal of the source 10.

The main current path through the load 12 is therefore from the positive terminal of the source 10, through the switch 11, through the load 12, through the limiter 13, through the controlled rectifier 14, through the signal-generating limiter 15, and thence to the negative terminal of the source.

For the purpose of applying a reverse-sense voltage across the controlled rectifier 14, in a manner to be described, there is provided a turn-off capacitor 16, which is connected through a second silicon controlled rectifier 17, across the combination of the first silicon controlled rectifier 14 and the signal-generating limiter 15.

It will be observed that when the second silicon controlled rectifier fires, that is becomes conductive, the capacitor 16 will be connected directly across the combination of the silicon controlled rectifier 14 and the signal-generating limiter 15.

The capacitor 16 is normally charged as shown by reason of the fact that one of its plates is connected through switch 18 a point which is normally substantially at ground potential, since the controlled rectifier 14 and the signal-generating device 15 have negligible voltage-drop in the normal operating condition. The opposite plate of the capacitor 16 is connected through resistors 19 and 20, to the positive terminal of the voltage source 10. Thus this plate is maintained substantially at the same potential as the positive terminal of the source 10. The purpose of the resistors 19 and 20 will be described later.

The gate electrode 17a of the controlled rectifier 17 is connected through a resistor 21 to the positive side of the signal-generating device 15.

In operation, this portion of the circuit functions as follows. Closing the main switch 11 causes current to flow through the load circuit comprising the load 12, the limiter 13, the controlled rectifier 14, and the signal generating device 15. Upon the occurrence of predetermined current conditions in the load circuit, the signal generating device 15 is suddenly transformed to a high impedance state, causing a substantial voltage drop to appear across it. This voltage drop is applied as a signal to the gate electrode 17a of the controlled rectifier 17, causing it to fire.

Firing of the controlled rectifier 17 permits the capacitor 16 to discharge, through the controlled rectifier 17 and applying a negative voltage to the line side of the controlled rectifier 14 and a positive voltage to the ground side of the signal generator 15. It will be observed that current flow in reverse sense through the signal generator 15 and the controlled rectifier 14 is not possible, because of the unidirectional properties of the rectifier 14, and also because of the fact that load current flowing through the rectifier 14 and the limiter 15, produces a subtractive effect as to net current attempted to be passed through these elements in the opposite direction.

On the other hand, it will be observed that there is a closed current path for discharge of the capacitor 16 through the controlled rectifier 17, through the ground return line of the source 10, through the source 10 and thence through the switch 11 and the load 12 and the limiter 13, and thence through 18 back to the opposite side of the capacitor.

The capacitor 16 therefore discharges through this path until its charge is reduced to zero. See the simplified schematic of FIGURE 2.

FIGURE 2 shows in a simplified schematic form the relation of the main circuit components of the circuit of FIGURE 1. It will be readily observed from this figure that when the controlled rectifier 17 is placed in conducting condition in response to firing of the signal generating limiter 15, the capacitor 16 is free to discharge its current through a path including the rectifier 17, the source 10, the load 12, and the limiter 13. As previously mentioned, if the load 12 becomes short circuited, then the only impedance in this loop other than the limiter 13 is the internal impedance of the source 10 and the comparatively negligible impedance of the conductors themselves and of the rectifier 17 and capacitor 16.

While the capacitor 16 is discharging in this manner, a negative voltage is maintained across the controlled rectifier 14. This causes the controlled rectifier 14 to be driven to a non-conducting condition, thereby turning off the main load current and retaining it in an off condition.

For the purpose of applying a "turn-on" positive pulse to the gate electrode 14a of the controlled rectifier 14, means is provided comprising a resistor 22 and capacitor 23. The resistor 22 is connected at one end to the gate electrode 14a of the controlled rectifier 14, and the capacitor 23 is connected at its other side to a switch 24 by which it is adapted to be connected to the contact 24a which is at line potential. This causes a positive pulse of voltage to be transmitted through the resistor 22 to the gate electrode 14a, thereby turning the controlled rectifier 14 to the "on" or conducting condition, and establishing current in the load circuit, the main switch 11 being in the closed position.

The switch 24 is preferably normally in the position shown in FIGURE 1 in which it is in contact with the contact 24b, permitting the capacitor 23 to discharge through the resistor 22. When the switch 24 is moved into contact with the contact 24a to create a turn-on pulse as described above, and released, it is preferably returned by inherent spring action to contact with the contact 24b.

For the purpose of permitting a manual turn-off of the load current, a switch 25 is provided connected to the positive side of the source 10 and serving when closed to apply positive voltage through the resistor 26 to the gate electrode 17a of the rectifier 17.

For the purpose of charging the capacitor 16 to line potential quickly when desired, for example, following automatic turn-off of the controlled rectifier 14, the switch 18 is provided which is normally in closed circuit position with respect to 18A. When the switch 18 is placed in closed circuit position with respect to contact 18b, the corresponding plate of the capacitor 16 is connected directly to the ground return line of the source 10.

In order to facilitate rapid charging of the capacitor 16, a switch 27 is provided, shunting the resistor 19, and leaving only the resistor 20 between the capacitor 16 and the positive side of the source 10. The resistor 19 is normally made substantially greater than the resistor 20, whereby rapid charging of the capacitor 16 is permitted by moving the switch 18 to its closed position with respect to contact 18b, and by closing the switch 27 bypassing the resistance 19.

It will be observed that following operation of the device in the manner described, the capacitor 16 having discharged through the source 10 and the load 12, the charge on the capacitor 16 will be reversed with respect to that indicated in FIGURE 1.

For the purpose of indicating the "off" condition of the circuit, an indicator lamp 28 is provided, connected in series with a resistance 29 between a point common to the switch 18 and the capacitor 16 and ground. Since there is normally substantially no difference of potential between these two points, both being substantially negative, the lamp 28 is normally unlighted. Following discharge of the capacitor 16, however, and turn-off of the controlled rectifier 14, the upper end of resistor 29 is substantially at positive line potential, causing the lamp 28 to be lighted.

The current limiter 13 utilized in accordance with the invention, as well as the signal-generating device 15, are both preferably of the type shown in copending application Serial Number 29,629 filed May 18, 1960, by R. L. Hurtle, now Patent No. 3,117,203, and assigned to the same assignee as the present invention.

While the construction and operation of this type of current limiter is set forth in detail in the aforesaid application, this construction and operation will be described here briefly for the sake of completeness. Referring to FIGURE 3, the current limiter construction referred to comprises a pair of cylindrical metallic terminal portions 40 and 41. The terminals 40, 41, have integral circular flange portions 42, 43, respectively.

A circular disc 44 of ceramic material is positioned between the flanges 42, 43, and is securely bonded thereto. A pair of annular rings 45, 46, also of ceramic material, are positioned against the outer surfaces of the flanges 42, 43 and are also securely bonded thereto. The disc 44 has a central capillary opening 47 therethrough, having enlarged end portions as shown. Capillary 47 and its enlarged end portions are completely filled with a liquid conducting medium such as mercury, which is contained therein by the terminal members 40, 41. A filling opening, and sealing means, not shown, are also included, as described in the aforesaid application.

In operation, the current limiter normally has a relatively low resistance, the current passing from the terminal 40 to the terminal 41 through the mercury filled capillary 47.

On the occurrence of high-current conditions, such as short circuit conditions, the mercury in the capillary 47 is suddenly transformed to a vapor state, although confined to its initial volume. Conduction through the vapor occurs by an arcing process, but the resistance therethrough is such as to limit the current to a relatively low value. The current is not permanently interrupted by the current limiter, however.

The change of state of the mercury from liquid conducting condition to vapor high resistance conditions occurs very suddenly. It is well known, for example, that once the temperature of a body of liquid has been raised to the point where vaporization occurs, the actual process of change from one state to the other occurs virtually instantaneously. Thus the resistance of the limiter 12 increases, when this occurs, at a rate which is independent of the current at that time. Thus, referring to signal generating limiter 15, when this change occurs, the line side of the limiter 15, which is normally a small amount above "ground" potential, suddenly assumes a potential very much higher above ground. Thus a strong positive voltage pulse is applied to the gate electrode of the rectifier 17, placing this controlled rectifier in conducting condition.

The limiter 13 is constructed and operates in a manner generally similar to that described in connection with the signal generating limiter 15. In accordance with the invention, however, the limiter 13 is designed and constructed to carry currents substantially above the current values which will cause firing of the signal-generating limiter 15.

If the circuit is considered in its condition with the limiter 13 omitted, it will be observed that when the rectifier 17 is placed in conducting condition and the capacitor 16 discharges through the circuit comprising the source 10 and the load 12, the only impedance, besides that of the conductors themselves, is that of the source 10 and the load 12. If the cause of the overcurrent condition should be a complete short circuit in the load itself, this would be eliminated as an impedance, leaving only the internal impedance of the source 10.

As is well known, the time required for a capacitor to discharge is determined by the R-C constant of the circuit, in accordance with the formula: $t=kRC$. It will be apparent that as the resistance is decreased, the time for discharge is likewise decreased. It will also be observed that the time during which reverse voltage is applied to the controlled rectifier 14 is equal to the time during which the capacitor 16 is discharging. If the capacitor 16 discharges too rapidly, the reverse voltage appearing across the controlled rectifier 14 will not be of sufficient time duration to place the controlled rectifier 14 in a non-conducting condition, thereby failing to turn off the load circuit and provide the desired protection.

For this reason, there is provided in accordance with the invention, a current limiting device 13 as described above which has its parameters selected so that it will fire only when the current reaches a level substantially above that required to fire the limiter 15.

For purposes of discussion, assume a signal generating device 15 which is set to cause automatic turn-off of the controlled rectifier 14 at 125% of normal rated current of the load 12. It will now be observed that upon the firing of the rectifier 17, the driving voltage in the load circuit is doubled, since this places the voltage supplied by the capacitor 16 in series with the voltage supplied by the source 10, tending to create current in the load 12. It may, therefore normally be expected that the load current, upon actuation of the rectifier 17, will jump to substantially double its immediately preceding value.

In accordance with the invention, both of these undesirable results, that is (a) the temporarily extremely high current caused by discharge of the capacitor 16, and (b) the foreshortening of the time duration of the reverse voltage on the rectifier 14 with decreasing load values, are substantially overcome by the present invention.

Thus the limiter 13 is chosen so that it will fire on the occurrence of current conditions substantially higher than those required to fire the limiter 15 and yet substantially below the levels which might cause damage to the circuit components or which might permit too rapid discharge of the capacitor 16.

The operation of the invention is shown in the graph of FIGURE 4, which shows the voltage conditions existing across the controlled rectifier 14 immediately following discharge of the capacitor 16. Curve A of this chart shows the conditions which exist when the circuit is turned off automatically upon operation of the signal generating limiter 15, and under overload conditions which are of such low level that the limiter 13 does not come into operation.

Thus, in such a case, the voltage across the rectifier 14 is substantially zero during normal operation. Upon operation of the signal generating limiter 15, causing firing of the controlled rectifier 17 and the discharge of the capacitor 16, the voltage instantly drops to a negative value as indicated by point P on the chart. As the capacitor 16 discharges, the voltage rises toward zero along the line designated A and crosses the zero line and continues to rise as shown. Thus as indicated in the chart of FIGURE 4, the voltage across the main rectifier 14 remains negative during the time marked $T_a$, which period is long enough to place the controlled rectifier 14 in non-conducting condition, that is to turn it off.

Curve B of FIGURE 4 indicates the conditions which would occur in the circuit of FIGURE 1 under conditions of high short circuit, if the limiter 13 were not present in the circuit. As shown in the graph, the voltage again immediately drops to the negative point P, at which point the capacitor 16 begins discharging. Because of the low total impedance in the discharge circuit of the capacitor 16, however, the capacitor discharge is relatively rapid, and the voltage across the rectifier 14 rises to zero and crosses on the curve marked B on the graph. Thus the voltage remains in a negative sense across the rectifier 14 only for the time interval designated as $T_b$. This time interval may *not* be long enough to place the rectifier 14 in a non-conducting condition.

Curve C of FIGURE 4 indicates the operation of the circuit under the same conditions as existed in connection with curve B, excepting that the limiter 13 is included in the circuit, in accordance with the invention. As shown on the graph, in this case, the voltage across the rectifier 14 immediately drops to the negative value as indicated by P, and then begins to rise on the same line as curve B until point D is reached. At this point, the total load current rises to a value causing the limiter 13 to fire. This immediately decreases the voltage across the rectifier 14 again to point E, from which point the voltage then rises at a greatly decreased rate along the line indicated by curve C, ultimately crossing the zero line. The total time interval during which negative voltage is maintained across the main rectifier 14 in this case, is as designated by the letters $T_c$.

It will therefore be observed that the firing of the secondary limiter 13 in the load circuit introduces an impedance sufficient to greatly slow down the discharge time of the capacitor 16 and to maintain a reverse voltage on the main controlled rectifier 14 for a clearly adequate period of time to ensure turn off of this device.

In accordance with one embodiment of the invention, the circuit elements shown in the circuit diagram of FIGURE 1 had the following values:

Voltage source 10—50 volts D.C.
Capacitor 16—125 microfarads (non-polarized).
The load 12 was adjusted to normally draw a current of 5 amperes.
Signal-generating limiter 15—5 amperes capacity—designed to fire at approximately 24 amperes.
Limiter 13—5 amperes capacity designed to fire at approximately 30 amperes.
Resistance 20—200 ohms at 5 watts.
Resistance 19—10,000 ohms at 3 watts.
Resistance 22—500 ohms at 2 watts.
Resistance 21—500 ohms at 2 watts.
Resistance 29—500 ohms at 2 watts.
Capacitor 23—5 microfarads.
Rectifier 14—silicon controlled rectifier nominal rating 16 amp., 100 volts as manufactured by G.E. Co. under designation 2N682(C35A)034.
Rectifier 17—silicon controlled rectifier nominal rating 16 amp., 100 volts as manufactured by G.E. Co. under designation 2N682(C35A)034.

In FIGURE 5, the invention is shown as embodied in a circuit which is generally similar to that of FIGURE 1, excepting as to the signal-generating circuit.

In this case, a resistor 35 is provided, in series relation in the load circuit. The voltage drop appearing across resistor 35 is applied, through a resistor 36 and a voltage breakdown device such as a Zener diode 37, to the gate 17A of the controlled rectifier 17. The Zener diode 37 is essentially a rectifier which normally blocks current flow toward the gate 17A, but which breaks down at a predetermined voltage, and permits such current flow. When the load current increases, the voltage drop across resistor 35 increases accordingly. When the voltage drop reaches the point sufficient to break down the Zener diode, current flows to the gate 17A and appears as a positive pulse between the gate 17A and the cathode 17B. This places the controlled rectifier 17 in conducting condition, and permits discharge of the capacitor 16 in the manner previously described.

It will be understood that while I have shown a specific circuit arrangement incorporating the invention, many modifications thereof may readily be made by those skilled in the art, and I therefore intend by the appended claims to cover all such modifications as fall within the true spirit and scope of the invention.

What I claim as new and desire to secure by Letters Patent of the United States is:

1. An electrical protective circuit comprising:
    (a) a main current control device having a first condition in which it is conductive in a first direction and a second condition in which it is substantially non-conductive in said first direction, said device being capable of being changed from said first condition to said second condition by reducing current therethrough in said first direction to zero for a predetermined time,
    (b) means for connecting said main current control device electrically in series with a power consuming load across the terminals of a power source,
    (c) electrical charge storage means,
    (d) means for connecting said electrical charge storage means electrically in parallel with said current control device upon the occurrence of predetermined electrical conditions in said load circuit, the polarity of said charge storage means being such as to tend to cause current flow through said control device in a direction opposite to said first direction, whereby the charge stored by said electrical charge storage means is caused to discharge through a discharge path including said electrical power source and said load,
    (e) means limiting the rate of discharge of said electrical charge storage means through a path including said electrical power source and said load, comprising a current-limiting device connected electrically in series with said load and in said discharge path of said charge storage means, and
    (f) said current-limiting device having a relatively low resistance normally and changing suddenly to relatively high resistance upon the occurrence of predetermined current conditions therethrough without permanently interrupting conductivity therethrough.

2. An electrical protective circuit comprising:
    (a) a main current control device having a first condition in which it is conductive in a first direction and second condition in which it is substantially non-conductive in said first direction, said device being capable of being changed from said first condition to said second condition by reducing current therethrough in said first direction to zero for a predetermined time,
    (b) means for connecting said main current control device electrically in series with a power consuming load across an electrical power source,
    (c) electrical charge storage means,
    (d) means for connecting said electrical charge storage means electrically in parallel with said current control device upon the occurrence of predetermined current conditions through said current control device, the polarity of said charge storage means being such as to tend to cause current flow through said control device in a direction opposite to said first direction whereby the charge of said charge storage means is caused to discharge through a discharge path including said electrical power source and said load,
    (e) means for limiting the rate of discharge of said charge storage means through said discharge path including a current limiting device comprising a filamentary conductor, terminals leading to and from said conductor respectively, and means supporting and confining said filamentary conductor in such a manner that upon the passage of excess current through said filamentary conductor the impedance of said conductor is substantially increased without permanently interrupting conductivity therethrough, and
    (f) means connecting said current limiting device electrically in series in a portion of said load circuit which lies in said discharge path of said electric charge storage means.

3. An electrical protective circuit comprising:
    (a) a main controlled rectifier,
    (b) means connecting said main controlled rectifier electrically in series with a power consuming load across an electrical power source,
    (c) a pre-charged electrical capacitor,
    (d) means for connecting said pre-charged electrical capacitor across said main controlled rectifier upon the occurrence of predetermined current conditions through said load with the voltage of said charge storage means in opposite sense to voltage due to said electrical power source,
    (e) said capacitor when connected across said controlled rectifier having a discharge path through a portion of said load circuit including said power source and said power consuming source,
    (f) means controlling the rate of discharge of said capacitor through said discharge path comprising an impedance connected electrically in series in said discharge path of said charge storage means, said current limiting device having a relatively low resistance normally and changing suddenly to a relatively high resistance upon the occurrence of predetermined current conditions therethrough without permanently interrupting current therethrough.

4. An electrical protective circuit comprising:
    (a) a first controlled rectifier,
    (b) means for connecting said first controlled rectifier electrically in series with a power consuming load across an electrical power source,
    (c) electric charge storage means,
    (d) means for connecting said charge storage means across said controlled rectifier upon the occurrence of predetermined current conditions in said circuit in a sense opposite to the voltage of said electrical power source,
    (e) there being a discharge path for said charge storage means through a portion of said load circuit including said electrical power source and said power consuming load, and
    (f) means for controlling the rate of discharge of said charge storage means comprising a current limiting device including at least one filamentary conductor and means supporting and confining said filamentary conductor in such a manner that upon the occurrence of predetermined high current conditions therethrough the impedance of said filamentary conductor increases substantially without permanently interrupting current therethrough, said current limiting device being connected electrically in series in said discharge path of said charge storage means.

5. An electrical protective circuit comprising:
(a) a first controlled rectifier,
(b) means for connecting said controlled rectifier electrically in series with a power consuming load across an electrical power source,
(c) a capacitor,
(d) a second controlled rectifier connected electrically in series with said capacitor, said second controlled rectifier having an anode terminal, a gate terminal and a cathode terminal,
(e) means connecting said series combination of said capacitor and said second controlled rectifier electrically in parallel with a portion of said load circuit including said first controlled rectifier,
(f) an electrical impedance device connected electrically in series with said first controlled rectifier,
(g) means for impressing the voltage drop existing across said impedance between said gate and said cathode of said second controlled rectifier, whereby a predetermined increase in said load current causes a predetermined increased voltage drop through said impedance and change of said second controlled rectifier from non-conducting to conducting condition,
(h) means for maintaining an electrical charge on said capacitor while said second controlled rectifier is in said non-conducting condition, said charge being in such a sense as to operate when said second controlled rectifier is placed in said conducting condition to tend to cause current flow through said first controlled rectifier in a direction opposite to current from said power source,
(i) said capacitor having a discharge path through a part of said load circuit including said electrical power source and said power consuming load, and
(j) means for controlling the rate of discharge of said capacitor through said discharge path comprising a current limiting device connected electrically in series in said discharge path, said current limiting device including at least one filamentary conductor and means supporting and confining said filamentary conductor in such a manner as to cause the impedance of said conductor to increase substantially upon the occurence of predetermined current conditions therethrough without permanently interrupting current therethrough.

6. An electrical protective circuit comprising:
(a) a first controlled rectifier,
(b) means connecting said controlled rectifier electrically in series with a power consuming load across an electrical power source,
(c) a capacitor,
(d) means connecting said capacitor in parallel with said first controlled rectifier,
(e) means for maintaining an electrical charge on said capacitor,
(f) said connecting means including a second controlled rectifier electrically in series with said capacitor and normally in a non-conducting condition,
(g) a first current limiting device connected electrically in series with said load,
(h) means connecting said first current limiting device to said second controlled rectifier whereby to cause change of said second controlled rectifier to conducting condition upon the occurrence of predetermined voltage drop across said first current limiting device, whereby to impress the charge of said charge storage means on said control device in a direction tending to cause current flow therethrough in a non-conducting direction, said charge storage means having a discharge path including said source,
(i) and means for limiting the rate of discharge of said capacitor comprising a second current-limiting device,
(j) each of said current-limiting devices comprising at least one filamentary conductor and means confining and supporting said filamentary conductor in such a manner as to cause the impedance of said conductor to increase substantially upon the passage of predetermined current therethrough without permanently interrupting the current therethrough, and
(k) said second current limiting device being connected electrically in series in a portion of said circuit comprising a part of the discharge path of said capacitor.

7. An electrical protective device comprising:
(a) a first controlled rectifier,
(b) means for connecting said controlled rectifier electrically in series with a power consuming load across an electrical power source,
(c) a capacitor,
(d) said capacitor having one terminal thereof connected through a second controlled rectifier to one side of said first controlled rectifier, and having its other terminal connected to the other side of said first controlled rectifier,
(e) said second controlled rectifier including a gate electrode,
(f) a signal generating impedance connected electrically in series with said first controlled rectifier,
(g) means coupling said signal generating impedance to said gate electrode of said second controlled rectifier, said coupling means comprising a voltage-breakdown device,
(h) means for maintaining a charge on said capacitor while said second controlled rectifier is in non-conducting condition, said charge on said capacitor being in such a sense as to tend to create current through said first controlled rectifier in a direction opposite to that of current from said electrical power source,
(i) said capacitor, when said second controlled rectifier is in conducting condition, having a discharge path through a portion of said load circuit including said electrical power source and said power consuming load,
(j) means for controlling the rate of discharge of said capacitor comprising a current limiting device including at least one filamentary conductor and means supporting and confining said filamentary conductor in such a manner that the impedance of said conductor is increased substantially upon the occurrence of predetermined current conditions therethrough without interrupting said current permanently,
(k) said current limiting device being connected electrically in series in said discharge path of said capacitor.

8. An electrical protective circuit comprising:
(a) a first controlled rectifier,
(b) means for connecting said controlled rectifier electrically in series with a power consuming load across an electrical power source,
(c) a capacitor,
(d) a second controlled rectifier connected electrically in series with said capacitor, said second controlled rectifier having an anode terminal, a gate terminal and a cathode terminal,
(e) means connecting said series combination of said capacitor and said second controlled rectifier electrically in parallel with a portion of said load circuit including said first controlled rectifier,
(f) an electrical impedance device connected electrically in series with said first controlled rectifier,
(g) means for impressing the voltage drop existing across said impedance between said gate and said cathode of said second controlled rectifier, whereby a predetermined increase in said load current causes a predetermined increased voltage drop through said impedance and change of said second controlled rectifier from non-conducting to conducting condition, (h) means for maintaining an electrical charge on said capacitor while said second controlled rectifier is in said non-conducting condition, said charge being in such a sense as to operate when said second controlled rectifier is placed in said conducting condition to tend to cause current flow through said first controlled rectifier in a direction opposite to current from said power source, (i) said capacitor having a discharge path through a part of said load circuit including said electrical power source and said power consuming load, and (j) means for controlling the rate of discharge of said capacitor through said discharge path comprising a current limiting device connected electrically in series in said discharge path, said current-limiting device having a relatively low resistance normally and changing suddenly to relatively high resistance upon the occurrence of predetermined current conditions therethrough without permanently interrupting conductivity therethrough.

9. An electrical protective circuit comprising:
(a) a first controlled rectifier,
(b) means connecting said controlled rectifier electrically in series with a power consuming load across an electrical power source,
(c) a capacitor,
(d) means connecting said capacitor in parallel with said first controlled rectifier,
(e) means for maintaining an electrical charge on said capacitor,
(f) said connecting means including a second controlled rectifier electrically in series with said capacitor and normally in a non-conducting condition,
(g) a first current limiting device connected electrically in series with said load,
(h) means connecting said first current limiting device to said second controlled rectifier whereby to cause change of said second controlled rectifier to conducting condition upon the occurrence of predetermined voltage drop across said first current limiting device, whereby to impress the charge of said charge storage means on said control device in a direction tending to cause current flow therethrough in a non-conducting direction, said charge storage means having a discharge path including said source,
(i) and means for limiting the rate of discharge of said capacitor comprising a second current-limiting device,
(j) each of said current-limiting devices having a relatively low resistance normally and changing suddenly to relatively high resistance upon the occurrence of predetermined current conditions therethrough without permanently interrupting conductivity therethrough,
(k) said second curren-limiting device being connected electrically in series in a portion of said circuit comprising a part of the discharge path of said capacitor.

10. An electrical protective circuit comprising:
(a) a first controlled rectifier,
(b) means for connecting said controlled rectifier electrically in series with a power consuming load across an electrical power source,
(c) a capacitor,
(d) a second controlled rectifier connected electrically in series with said capacitor, said second controlled rectifier having an anode terminal, a gate terminal and a cathode terminal,
(e) means connecting said series combination of said capacitor and said second controlled rectifier electrically in parallel with a portion of said load circuit including said first controlled rectifier,
(f) an electrical impedance device connected electrically in series with said first controlled rectifier,
(g) means for impressing the voltage drop existing across said impedance between said gate and said cathode of said second controlled rectifier, whereby a predetermined increase in said load current causes a predetermined increased voltage drop through said impedance and change of said second controlled rectifier from non-conoducting to conducting condition,
(h) means for maintaining an electrical charge on said capacitor while said second controlled rectifier is in said non-conducting condition, said charge being in such a sense as to operate when said second controlled rectifier is placed in said conducting condition to tend to cause current flow through said first controlled rectifier in a direction opposite to current from said power source,
(i) said capacitor having a discharge path through a part of said load circuit including said electrical power source and said power consuming load, and
(j) means for controlling the rate of discharge of said capacitor through said discharge path comprising a current-limiting device connected electrically in series in said discharge path, said current-limiting device comprising a body of mercury and means supporting and confining said body of mercury, said body of mercury vaporizing upon the occurrence of predetermined current conditions therethrough to substantially increase the impedance of said current-limiting device, and said body of mercury recondensing upon the cessation of said predetermined current conditions.

11. An electrical protective circuit comprising:
(a) a first controlled rectifier,
(b) means connecting said controlled rectifier electrically in series with a power consuming load across an electrical power source,
(c) a capacitor,
(d) means connecting said capacitor in parallel with said first controlled rectifier,
(e) means for maintaining an electrical charge on said capacitor,
(f) said connecting means including a second controlled rectifier electrically in series with said capacitor and normally in a non-conducting condition,
(g) a first current limiting device connected electrically in series with said load,
(h) means connecting said first current limiting device to said second controlled rectifier whereby to cause change of said second controlled rectifier to conducting condition upon the occurrence of predetermined voltage drop across said first current limiting device, whereby to impress the charge of said charge storage means on said control device in a direction tending to cause current flow therethrough in a non-conducting direction, said charge storage means having a discharge path including said source,
(i) and means for limiting the rate of discharge of said capacitor comprising a second current-limiting device,
(j) each of said current limiting devices comprising a body of mercury and means supporting and confining said body of mercury, said body of mercury vaporizing upon the occurrence of predetermined current conditions therethrough to substantially increase the impedance of said current limiting device, said body of mercury recondensing upon the cessation of said predetermined current conditions, and (k) said second current limiting device being connected electrically in series in a portion of said circuit comprising a part of the discharge path of said capacitor.

References Cited by the Examiner

UNITED STATES PATENTS 3,042,838   7/1962   Bedford et al. _____ 317—33

OTHER REFERENCES

Solid State Products, Inc. Bulletin D420–04, December 1959, FIG. 29, pages 17, 18, and 19.

STEPHEN W. CAPELLI, *Primary Examiner*.

SAMUEL BERNSTEIN, *Examiner*.

J. D. TRAMMELL, *Assistant Examiner*.